US009778385B2

(12) United States Patent
Castor et al.

(10) Patent No.: US 9,778,385 B2
(45) Date of Patent: Oct. 3, 2017

(54) INSTANTANEOUS FREQUENCY MODULATION ACQUISITION SCHEME FOR SEISMIC SOURCES

(71) Applicant: CGG SERVICES SA, Massy (FR)

(72) Inventors: Kaelig Castor, Paris (FR); Thomas Bianchi, Paris (FR); John Sallas, Plano, TX (US)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/894,560

(22) PCT Filed: Jun. 25, 2014

(86) PCT No.: PCT/EP2014/063454
§ 371 (c)(1),
(2) Date: Nov. 30, 2015

(87) PCT Pub. No.: WO2014/207074
PCT Pub. Date: Dec. 31, 2014

(65) Prior Publication Data
US 2016/0131776 A1     May 12, 2016

Related U.S. Application Data

(60) Provisional application No. 61/839,915, filed on Jun. 27, 2013.

(51) Int. Cl.
*G01V 1/00*     (2006.01)

(52) U.S. Cl.
CPC ........ *G01V 1/005* (2013.01); *G01V 2210/127* (2013.01); *G01V 2210/1214* (2013.01)

(58) Field of Classification Search
CPC ........... G01V 1/005; G01V 2210/1214; G01V 2210/127
USPC .......................................................... 367/49
See application file for complete search history.

(56) References Cited

U.S. PATENT DOCUMENTS

| 8,274,862 | B2 | 9/2012 | Sallas |
| 2004/0044478 | A1 | 3/2004 | Moerig |
| 2009/0010103 | A1 | 1/2009 | Sallas et al. |
| 2010/0118647 | A1 | 5/2010 | Tenghamn |
| 2012/0287755 | A1 | 11/2012 | Eick et al. |
| 2012/0290214 | A1 | 11/2012 | Huo et al. |

OTHER PUBLICATIONS

International Search Report in related International Application No. PCT/EP2014/063454, mailed Nov. 26, 2014.
Written Opinion of the International Searching Authority in related International Application No. PCT/EP2014/063454, mailed Nov. 26, 2014.

*Primary Examiner* — Daniel L Murphy
(74) *Attorney, Agent, or Firm* — Patent Portfolio Builders PLLC

(57) ABSTRACT

Computing device, computer software and methods for generating sweep signals corresponding to plural sources that generate seismic waves. The method includes selecting a nominal sweep signal (S0); applying a perturbation (P) to the nominal sweep signal (S0); and calculating the sweep signals (Sn) by varying the perturbation (P), each sweep signal corresponding to a seismic source.

20 Claims, 13 Drawing Sheets

INSTANTANEOUS FREQUENCY MODULATION ACQUISITION SCHEME FOR SEISMIC SOURCES

BACKGROUND

Technical Field

Embodiments of the subject matter disclosed herein generally relate to methods and systems and, more particularly, to mechanisms and techniques for generating an acquisition scheme for vibratory sources.

Discussion of the Background

Reflection seismology is a method of geophysical exploration to determine the properties of a portion of a subsurface layer in the earth, which information is especially helpful in the oil and gas industry. Conventional reflection seismology uses a controlled source that sends mechanical waves into the earth. By measuring the time it takes for the reflections and/or refractions to come back to plural receivers, it is possible to estimate the depth and/or composition of the features causing such reflections. These features may be associated with subterranean hydrocarbon deposits.

Various sources of seismic energy have been utilized in the art to impart the seismic waves into the earth. Such sources have included two general types: 1) impulsive energy sources, and 2) seismic vibrator sources. The first type of geophysical prospecting utilizes an impulsive energy source, such as dynamite or a marine air gun, to generate the seismic signal. With an impulsive energy source, a large amount of energy is injected into the earth in a very short period of time. Accordingly, the resulting data has a relatively high signal-to-noise ratio, which facilitates subsequent data processing operations. On the other hand, use of an impulsive energy source can pose certain safety and environmental concerns.

The second type of geophysical prospecting employs a seismic vibrator (e.g., a land or marine seismic vibrator) as the energy source, wherein the seismic vibrator is commonly used to propagate energy signals over an extended period of time, as opposed to the near instantaneous energy provided by impulsive sources. Thus, a seismic vibrator may be employed as the source of seismic energy which, when energized, imparts relatively low-level energy signals into the earth. The seismic process employing such use of a seismic vibrator is sometimes referred to as "VIBROSEIS" prospecting. In general, vibroseis is commonly used in the art to refer to a method used to propagate energy signals into the earth over an extended period of time, as opposed to the near instantaneous energy provided by impulsive sources. The data recorded in this way is then correlated to convert the extended source signal into an impulse.

Typically, the impartation of energy with vibrator devices is for a preselected energization interval, and data are recorded during the energization interval and a subsequent "listening" interval. It is desirable for the vibrator to radiate varying frequencies into the earth's crust during the energization interval. In such instances, energy at a beginning frequency is first imparted into the earth, and the vibration frequency changes over the energization interval at some rate until the end frequency is reached at the end of the interval. The difference between the beginning and end frequencies of the sweep generator is known as the range of the sweep, and the length of time in which the generator has to sweep through those frequencies is known as the sweep time.

Vibrators typically employ a sweep generator, and the output of the sweep generator is coupled to the input of the vibrator device. The output of the sweep generator dictates the manner in which the frequency of the energization signal, which is imparted into the earth, varies as a function of time.

Several methods for varying the rate of change of the frequency of the sweep generator during the sweep time have been proposed. For example, in the case of a linear sweep, the frequency output of the sweep generator changes linearly over the sweep time at the rate dictated by the starting and end frequencies and the sweep time. Further, nonlinear sweeps have been proposed to shape the output frequency spectrum amplitude in which the rate of change of the frequency of the sweep generator varies nonlinearly between the starting and end frequencies over the sweep time. Examples of nonlinear sweeps have been quadratic sweeps and logarithmic sweeps.

The frequency of the seismic sweep may start low and increase with time (i.e., "an upsweep") or it may begin high and gradually decrease (i.e., "a downsweep"). Typically, the frequency range today is, say from about 3 Hertz (Hz) to some upper limit that is often less than 200 Hz, and most commonly the range is from about 6 Hz to about 100 Hz.

The seismic data recorded during vibroseis prospecting (hereinafter referred to as "vibrator data") comprises composite signals, each having many long, reflected wavetrains superimposed upon one another. Since these composite signals are typically many times longer than the interval between reflections, it is not possible to distinguish individual reflections from the recorded signal. However, when the seismic vibrator data is cross-correlated with the sweep signal (also known as the "reference signal"), the resulting correlated data approximates the data that would have been recorded if the source had been an impulsive energy source.

In order to increase the Vibroseis acquisition productivity, there is a present trend in the industry to perform simultaneous shooting. A problem with simultaneous shooting is the crosstalk induced by each source. This problem, usually named the "cocktail party" problem, prevents retrieving each individual shot without source-coupling noise. Several methods are investigated to treat the simultaneous shooting issues. Minimizing the mixture noise in simultaneous shooting can be achieved either after acquisition during data processing, or before acquisition by choosing adequate source signals in order to facilitate the shot separation. A possible solution is to choose orthogonal signals for driving the sources or, at least, weakly correlated signals for the sources. The design of separable orthogonal pseudo-random source signals using pseudo-random source signals as described in U.S. Pat. No. 8,274,862, assigned to the assignee of the present application, the entire content of which is incorporated by reference herein have been developed. Pseudo-random signals have good orthogonal properties. Beyond their high-productivity potential, they have the advantage of minimizing the eventual excitation of resonance frequencies of infrastructures in urban or industrial environments because their energy is spread over the overall time-frequency plan. Two difficulties noted with the use of pseudo-random source signals are: 1) they are more difficult to be handled by the vibrator's electronic servo-control mechanism than swept sine waves, and 2) the IMD (intermodulation distortion) noise can be more difficult to remove in processing than harmonic noise associated with swept sine wave signals. The first difficulty can lead to output source signals whose amplitude spectrum do not follow the amplitude spectrum of the reference signal and can vary as the source moves from shot point to shot point.

The second difficulty can produce noise artifacts that if not removed can mask the reflection data.

Thus, there is a need for finding other type of orthogonal driving signals that simultaneously drive seismic sources and are easy to control with minimum intermodulation noise.

SUMMARY

According to one exemplary embodiment, there is a method for generating sweep signals corresponding to plural sources that generate seismic waves. The method includes selecting a nominal sweep signal (S0); applying a perturbation (P) to the nominal sweep signal (S0); and calculating the sweep signals (Sn) by varying the perturbation (P), each sweep signal corresponding to a seismic source.

According to another embodiment, there is a computing device for generating sweep signals corresponding to plural sources that generate seismic waves. The computing device includes a processor configured to select a nominal sweep signal (S0); apply a perturbation (P) to the nominal sweep signal (S0); and calculate the sweep signals (Sn) by varying the perturbation (P), each sweep signal corresponding to a seismic source.

According to another embodiment, there is a computer readable medium including computer executable instructions, wherein the instructions, when executed, implement a method for generating sweep signals corresponding to plural sources that generate seismic waves, as discussed in the above paragraphs.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
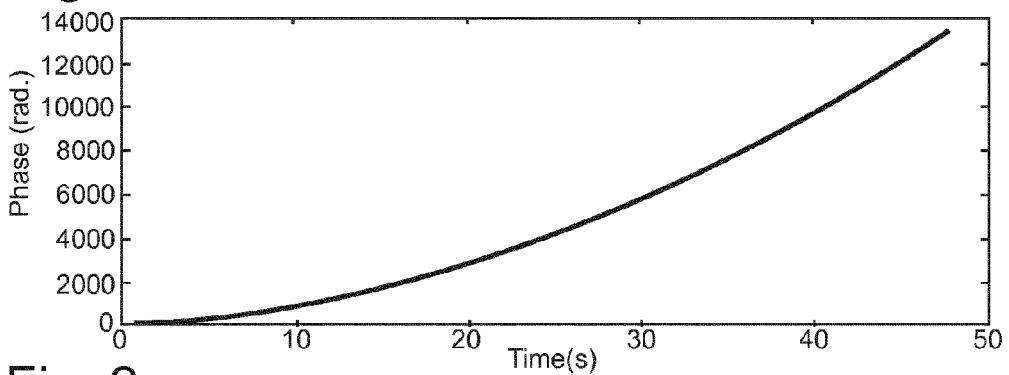
FIGS. 1-4 are graphs of instantaneous phase, instantaneous frequency, sweep rate and amplitude power spectrum for a source signal having a linear sweep.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibroseis seismic source. However, the embodiments to be discussed next are not limited to this structure, but may be applied to other arrays or sources that generate a seismic wave having a controlled frequency range.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a nominal Vibroseis source signal is modified to have various types of sweep rate, instantaneous phase and instantaneous-frequency modulation rates. Changes in the sweep rate in the Vibroseis sources give useful source separation properties for simultaneous shooting. Conceptually, this source signal design can be seen as an ideal concatenation of multiple normalized short sweeps with different characteristics like unique sweep rates, sweep times and/or frequency bandwidths. The initial phase of the modified frequency-modulation term in the signal generation can be changed for the use of numerous separable Vibroseis sources. The time-averaged power, the ease with which the spectrum can be shaped in conjunction with desirable autocorrelation and cross-correlation properties make this a viable source signal option for surveys conducted using simultaneous sources. Another advantage of instantaneous-frequency modulated sweeps is that they precisely have an instantaneous frequency that can be clearly identified and handled by the vibrator electronics, and also used for noise identification which is not the case for pseudo-random sweeps.

Thus, according to an embodiment, there is a method for reaching pseudo-orthogonality between sources by selecting a nominal sweep and then modifying its characteristics by modulating/and or altering the sweep rate, the instantaneous phase and/or the instantaneous frequency of a nominal "sweep" (or "chirp"). A parameterized perturbation function can be used to create a suite of pseudo-orthogonal sweeps, by changing, for example, the parameters defining the frequency modulation such as the endpoint values, frequency or the initial phase of the modulation perturbation function, it is possible to obtain several resultant source signals almost orthogonal to one another. The amplitude spectrum of each resultant source signal shows, as discussed later, some oscillations and/or fluctuations associated with the sweep-rate and instantaneous-frequency oscillations so that the greater the dwell time (time spent to vibrate a certain frequency) is, the higher the amplitude spectrum is. The instantaneous frequency vs. time relationship of the resultant source signals can either be a strictly monotonous function or a non-monotonous function (alternatively increasing and decreasing) emitting several times the same frequency, or, in one case, a multi-valued function where several frequencies can be emitted at the same instant. For the last two cases, similarly to random signals, the amplitude spectrum becomes noisy by displaying some notches which can be a drawback; however, the cross-correlation is much more spread out over the overall time which improves the orthogonality between two signals.

In the case of a function characterized by a one-to-one mapping, a single instantaneous frequency is still identifiable so it is possible to use some existing noise removal techniques to overcome the source distortion. Also, a source signal with an identifiable instantaneous frequency is particularly well-adapted to the control of vibrator hydraulics and servo-mechanism even if it is not specifically required. The hydraulic fluid flow requirement of the source's servo-mechanism (if such source is used) is spread out over time for a random signal and the time signal is smooth so that the peak demand on hydraulic components is reduced. Typically, a vibrator controller is a closed loop feedback system whereby a drive signal applied to the servo-hydraulic system is adjusted so that the vibrator output signal (usually a force) tracks a reference (target) signal. Tracking of low bandwidth signals requires less closed-loop control bandwidth than is required to track high bandwidth signals. If only a narrow range of frequencies are imparted at every point within a sweep, the vibrator control electronics do not have to work as hard to maintain a low tracking error as they might if a pseudo-random sweep were used, for example the control response time can be slower.

Another advantage of the new signals is that the effective power of the sweep is higher for a pseudo-sine waveform signal than for a band-limited random source signal. An instantaneous frequency that is, for example, strictly a monotonous function of time leads to an amplitude spectrum without any discontinuity, which is an interesting advantage in comparison to the pseudorandom signals. By considering the stationary phase approximation, which is satisfied when the signal envelope varies slowly in regard to the instantaneous frequency, the amplitude spectrum of the source signal is proportional to the inverse of the square root of the sweep modulation rate (or "sweep rate"). The sweep rate is defined as the time derivative of the instantaneous frequency. Thus, it is possible to control the amplitude spectrum oscillations by tuning accordingly the sweep-rate variations.

Prior to discussing the novel method for generating driving signals with instantaneous-frequency modulation, a brief discussion about conventional Vibroseis acquisition is believed to be in order. The Vibroseis acquisition traditionally uses a sweep source signal s(t) defined as a sinusoid with a continuously variable instantaneous frequency F(t) defined by:

$$s(t)=E(t)\cos(\phi(t)) \quad (1)$$

where E(t) is the amplitude (i.e., the envelope) and is a positive continuous function over time interval [0, L] and L is the time duration of the sweep, i.e., the sweep length. If E(t)=1, the sweep is called a unit amplitude sweep. The amplitude function E(t) is usually tapered at the start and the end of the sweep. The instantaneous phase $\phi(t)$ is a continuous and smooth function over the sweep time-interval [0-L].

The instantaneous frequency F(t) in units of Hz of the sweep, which is the single frequency contained in the signal at a single time instant t, is a continuous function of time on interval [0, L] and it is expressed as the time derivative of the instantaneous phase:

$$F(t) = \frac{1}{2\pi} \frac{\partial \varphi(t)}{\partial t}. \quad (2)$$

The sweep rate R(t) in units of Hz/s is defined as the time derivative of the instantaneous frequency F(t):

$$R(t) = \frac{\partial F(t)}{\partial t}. \quad (3)$$

A linear up-sweep is defined by a constant sweep rate R(t) expressed as:

$$R = \frac{F_e - F_b}{L} \quad (4)$$

where $F_b$ is the beginning frequency and $F_e$ is the end frequency of the sweep and $F_e > F_b$. In other words, the frequency bandwidth of the linear sweep is the interval [$F_b$, $F_e$]. Thus, the instantaneous frequency of a unit amplitude sweep can be calculated based on equation (3) to be:

$$F(t) = \int_0^t R(\tau)d\tau. \quad (5)$$

Thus, for a linear up-sweep, the instantaneous frequency varies linearly with time as expressed by:

$$F(t) = F_b + \frac{F_e - F_b}{L}t. \quad (6)$$

Integrating equation (2) and using equations (1) and (6), it is possible to calculate the linear sweep as expressed by:

$$s(t) = E(t)\cos\left[2\pi\left(F_b + \frac{F_e - F_b}{2L}t\right)t\right]. \quad (7)$$

Figure 2:
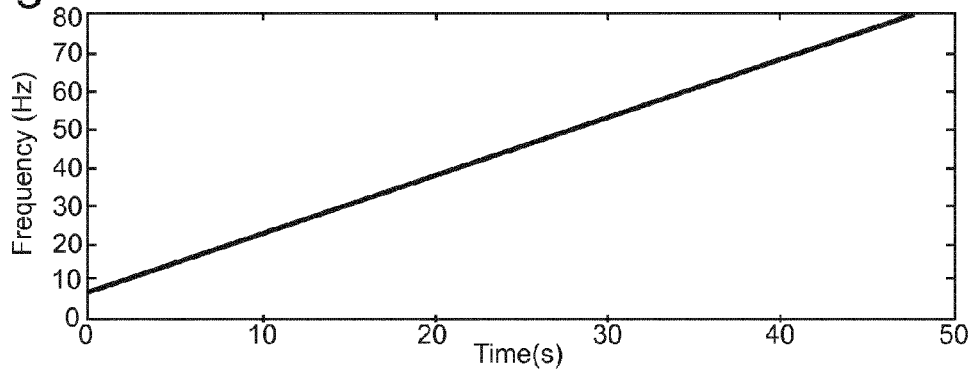
Figure 3:
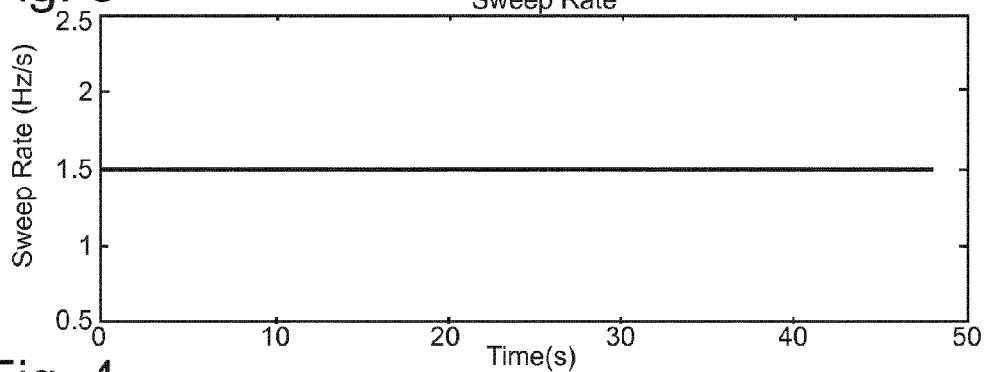
Figure 4:
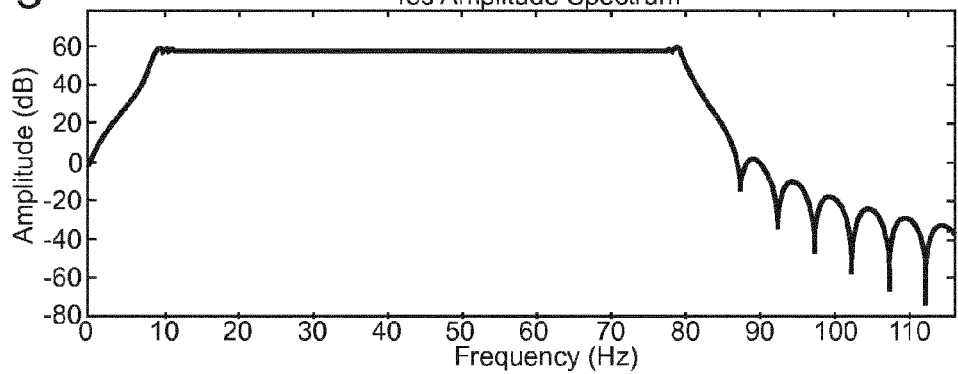

FIG. 1 shows the instantaneous phase, FIG. 2 shows the instantaneous frequency, FIG. 3 shows the sweep rate and FIG. 4 shows the amplitude spectrum for the linear sweep described by equation (7) assuming $F_b=8$ Hz, $F_e=80$ Hz and $L=48$s. While equations (4) to (7) describe a linear sweep, a non-linear sweep is next discussed.

In Vibroseis acquisition, the instantaneous frequency $F(t)$ is generally taken as a monotonically increasing function of time as illustrated in FIG. 2. A non-linear sweep is defined by a sweep rate $R(t)$ that is not constant with time, so that there is a non-linear relationship of the instantaneous frequency $F(t)$ versus time. Non-linear sweeps are generally used to shape the amplitude of the sweep frequency-spectrum. Indeed, using the method of stationary phase, which is described by E. Rietsch, "Vibroseis signals with prescribed power spectrum," Geophysical Prospecting 25, pp. 613-620, (1977), the entire content of which is incorporated herein by reference, it is possible to demonstrate the following relationship between the amplitude $|S(f)|$ of the sweep frequency-spectrum and the sweep rate $R(f)$ expressed as a function of frequency for a unit amplitude sweep:

$$|\tilde{S}(f)| \approx \frac{1}{\sqrt{R(f)}}. \tag{8}$$

Equation (8) provides information about how changes in sweep rate impact the shape of the energy spectral density of the source signal so that the performance of various candidate phase-modulation schemes can be predicted and/or evaluated. The energy spectral density of a signal is closely related to the shape of the autocorrelation properties of the source signal and generally, the smoother the energy spectral density is, the more compact and the lower the side-lobe levels will be for the autocorrelation wavelet. An energy spectral density shape without deep spectral notches and high energy output over all frequencies of interest, low side-lobes in the autocorrelation function and the ability to create orthogonal source signals for low cross-talk between sources are all desirable properties that are possible to achieve with frequency modulated swept sine wave signals as discussed next.

According to various embodiments to be discussed next, the instantaneous frequency $F(t)$ is selected to include a frequency perturbation term on top of a conventional swept sine wave for use with simultaneous sources to improve source separation. There are many frequency perturbation describing functions that might be used for defining the instantaneous frequency and the following embodiments present a few examples of such describing functions. However, those skilled in the art would recognize that other describing functions may be selected to achieve good source separation for simultaneously driven sources.

A general search procedure for finding sweeps, unique for each source, that fulfill some given conditions, e.g., when the sources operate simultaneously, their signal contributions need to be separated, is now discussed. The assumptions for this general procedure may be the following: suppose that it is desired to operate Ns sources simultaneously with a sweep length L, frequency range Fb to Fe, with a given amount of cross talk between the sweeps and a maximum drop in the energy spectrum, and, optionally, there are some equipment constraints and also some vibrator electronics constraints (e.g., the instantaneous sweep rate should not exceed Rmax). What procedure should be used to address all these factors and to calculate Ns sweep signals?

Figure 5:
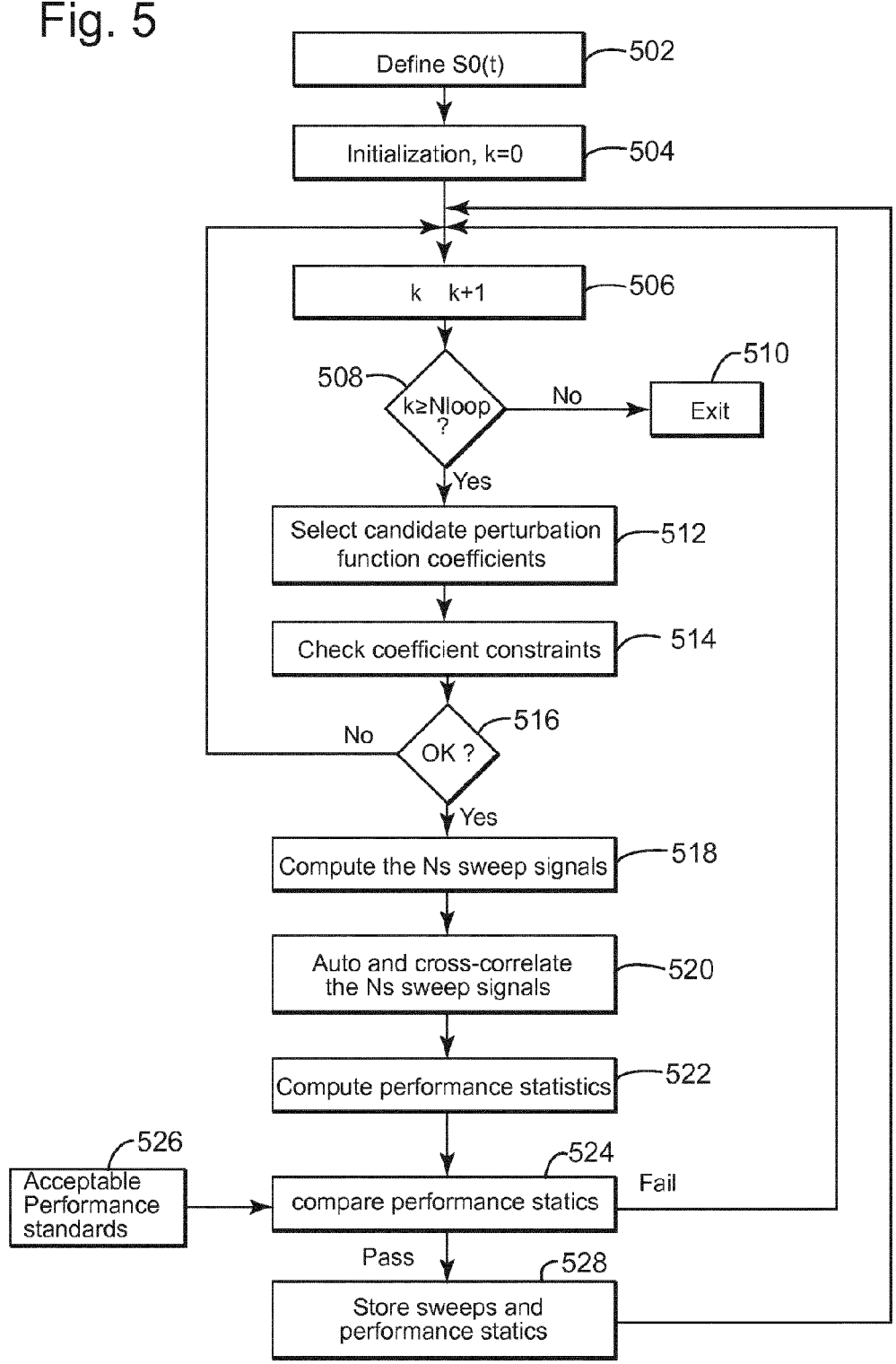
FIG. 5 is a flowchart of a method for calculating plural sweeps for plural sources.

One way to find an optimal solution is to perform a search procedure as now discussed with regard to FIG. 5. It is possible to parameterize the process so that only a few coefficients need to change to adjust each particular sweep. A general sweep frequency versus time profile and sweep amplitude versus frequency profile is selected and by selecting different coefficient values for the parameter set, each of the Ns sweeps can be perturbed. A polynomial could be used to represent the frequency perturbation function P. Specific examples of this perturbation function are later discussed. For example, for the case where there are Ns vibrators, four coefficients may be selected to characterize the perturbation function P:

$$P(t,n)=A_n+B_nt+C_nt^2+D_nt^3, \tag{9}$$

where n is a number between 1 and Ns. For this case P is a cubic polynomial. Those skilled in the art would recognize that other coefficients may be selected for the perturbation function. The nominal sweep to which the sweep rate perturbation will be applied is considered to be S0, and it is selected in step 500. Thus, a nominal sweep may be given by:

$$S0(t)=\alpha(t)\cos(\phi_0+2\pi\int F_{nom}(t)dt) \tag{10}$$

and the perturbed Ns candidate sweeps are given by:

$$S_n(t,n)=\alpha(t)\cos\{(\phi_n+2\pi\int[F_{nom}(t)+P(t,n)]dt\}, \tag{11}$$

where $F_{nom}$ is the nominal frequency, $\phi_n$ is the sweep phase offset, that is also part of the coefficient parameter set, and $\alpha(t)$ is the amplitude envelope of the sweep. To simplify matters, it is assumed that the amplitude envelope $\alpha(t)$ is the same for all the sources for the search. However, in practice, it may be desirable to include other search parameters to accommodate different amplitude envelopes for each source, for example, it is possible to have unique amplitude envelope functions for each source. The same is true for other terms of the nominal sweep S0, i.e., these terms may be constrained based on the physical limitations of each vibrator. An example is the case when the plural vibrators used during the seismic survey are different, i.e., they have different functional constraints. One such example may be when one vibrator is hydraulic and another one is electric. Those skilled in the art would understand that there are many other situations when the vibrators have different functional constraints, even if all the vibrators are hydraulic or electric.

The choice for the coefficients {An, Bn, Cn, Dn} of P are constrained so that the initial and final frequencies of the sweep are within $\delta_f$ (for example $\delta_f=1$ Hz) of the nominal sweep start and end frequencies for S0, $$-\delta_f \leq P(0,n) \leq \delta_f \text{ and} \tag{12}$$

$$-\delta_f \leq P(L,n) \leq \delta_f. \tag{13}$$

A further constraint can be added so that the instantaneous frequency for each of the n candidate sweeps be strictly monotonically increasing $$0 < \frac{d}{dt}P(t,n) + \frac{d}{dt}F(t). \tag{14}$$

Furthermore, it is possible to constrain the maximum change in the sweep rate introduced by P to deviate less than 50% ($\gamma=0.5$) from the sweep rate of the nominal sweep S0 so that the energy amplitude spectrum is close to the same (within −3 dB to +1.8 dB), $$\left|\frac{d}{dt}P(t)\right| \leq \gamma \cdot \frac{d}{dt}F(t). \tag{15}$$

Thus, there are 5 variables to modify during the search for finding the Ns sweeps.

Equations (12)-(15) can be rewritten as:

$$-\delta_f \leq A_n \leq \delta_f \tag{16}$$

$$-\delta_f \leq A_n + L\{B_n + L[C_n + L(D_n)]\} \leq \delta_f \tag{17}$$

$$0 < B_n + 2C_n t + 3D_n t^2 + \frac{d}{dt}F(t) \text{ for } 0 \leq t \leq L, \text{ and} \tag{18}$$

$$\left|B_n + 2C_n t + 3D_n t^2 - \frac{d}{dt}F(t)\right| \leq \gamma \frac{d}{dt}F(t). \tag{19}$$

With this formalism in place, the method advances to step 504 where an index k is initialized, for example, to be zero. Index k is indicative of how many iterations to perform before stopping the search process. In step 506 the value of index k is increased by one and in step 508 a condition for index k is checked, e.g., whether k is larger or equal to a given value $N_{loop}$, where the user selects the value. If index k has reached the value $N_{loop}$, then the process stops in step 510. If not, the process advances to step 512, in which candidate perturbation function coefficients are selected (see, e.g., equation (9)). After this, in step 514, the coefficients constraints (see, e.g., equations (16) to (19)) are checked. If the results of this step are determined in step 516 to have failed, the process returns to step 506 to select other coefficients. If the results are ok, the process advances to step 518 to compute the Ns sweep signals. In step 520 the Ns sweep signals may be auto- and cross-correlated with each other and in step 522 various performance statistics are computed. In step 524 the calculated performance statistics are compared with reference performance statistics stored in step 526 in a storage device associated with the computing device performing this process, and if the result is a pass, the calculated sweep signals are stored in step 528 and the process stops. Otherwise, the process returns to step 506 to select another set of coefficients.

In one example, F(t) is assumed to be a linear sweep so that it can be written as:

$$F(t) = Fb + Rt, \text{ where } R = \frac{Fe - Fb}{L} \text{ and} \tag{20}$$

$$0.5(1 - \cos(\pi t / TL)) \text{ for } t < TL$$

$$1 \text{ for } TL < t < L - t$$

$$\alpha(t) = 0.5(1 - \cos(\pi(L - t)/TL)) \text{ for } t > L - TL \tag{21}$$

where TL is the end taper length. For this example, if the following values are chose, TL=0.2 s, L=10 s, Fb=8 Hz, Fe=108 Hz, $\delta_f$=1 Hz (frequency bandwidth variation toleration) and $\gamma$=0.5, then R=10 Hz/s, F(t)=8+10t and equations (16) to (19) become:

$$-1 \leq A_n \leq 1 \tag{22}$$

$$-1 \leq A_n + 10 B_n + 100 C_n + 1000 D_n \leq 1 \tag{23}$$

$$-10 < B_n + 2C_n t + 3D_n t^2, \text{ for } 0 \leq t \leq 10, \text{ and} \tag{24}$$

$$5 \leq B_n + 2C_n t + 3D_n t^2 \leq 15, \text{ for } 0 \leq t \leq 10. \tag{25}$$

From here, for this specific example, a search can be performed by choosing $A_n$ from a set of random numbers contained in the closed interval of [−1,1] and $B_n$ can be chosen from a set of random numbers contained in the closed interval of [5,15]. Substituting the candidate values for $A_n$ and $B_n$ into inequalities (23) and (25), limits the range of random numbers pool for $C_n$ and $D_n$.

Figure 6:
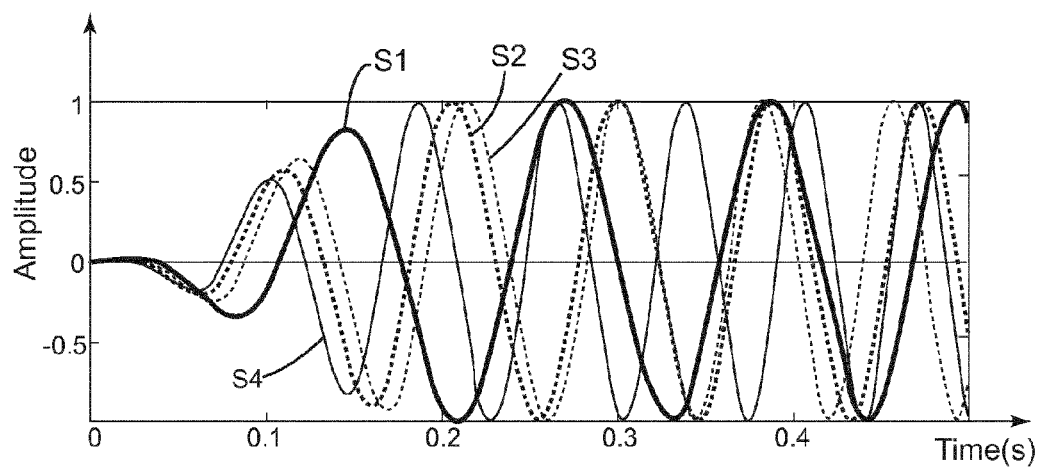
FIG. 6 illustrates four sweeps calculated based on the method illustrated in FIG. 5.
Figure 7:
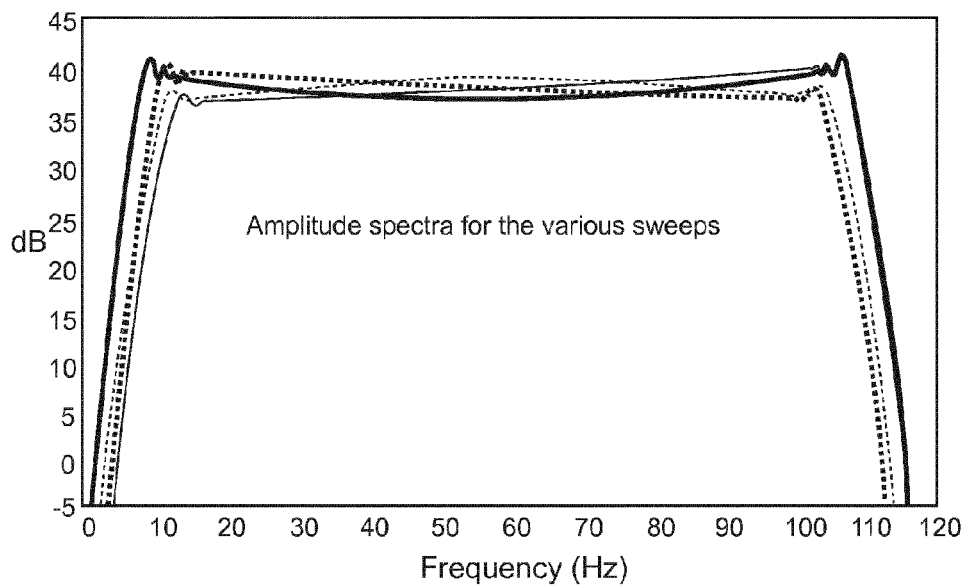
FIG. 7 illustrates the amplitude spectrum for the sweeps of FIG. 6.

Considering only four sources, i.e., Ns=4, the above algorithm was run for this specific example and FIG. 6 illustrates the sweep waveforms or signals versus time corresponding to the four sources S1 to S4 and FIG. 7 shows the amplitude spectra for the various sweeps.

Figure 8:
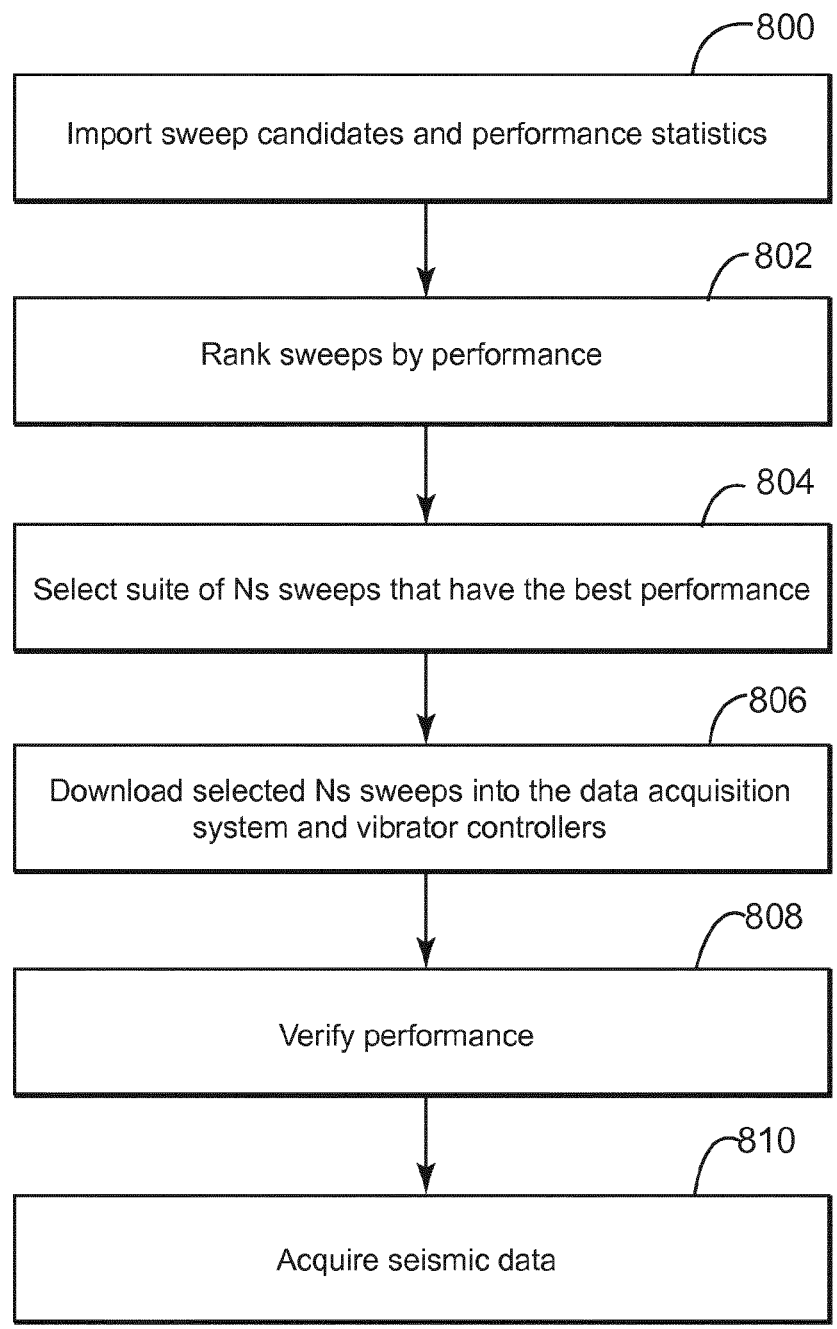
FIG. 8 is a flowchart of a method for selecting best sweeps for acquiring seismic data.

Recognizing that multiple sweeps may be calculated for the same source and all satisfy the criteria discussed above, there is a method, as illustrated in FIG. 8, for selecting appropriate sweeps. The method may include a step 800 of importing sweep candidates (e.g., calculated as described with reference to FIG. 5) and performance statistics, a step 802 of ranking the sweeps by performance, a step 804 of selecting a suite of Ns sweeps that have the best performance based on one or more criteria. For example, the ranking criteria may be based upon things like: cross-talk (cross-correlation noise between sweeps) where low cross-talk is desirable, and/or autocorrelation side-lobe levels where low side-lobe levels particularly at long lags is desirable; and/or, amplitude spectrum shape (where a sweep with less spectral droop for the same cross-talk level is preferable. A step 806 of downloading the selected Ns sweeps to the controller of the source, a step 808 of verifying the performance of the source with the downloaded sweeps, and a step 810 of acquiring the seismic data.

Figure 9:
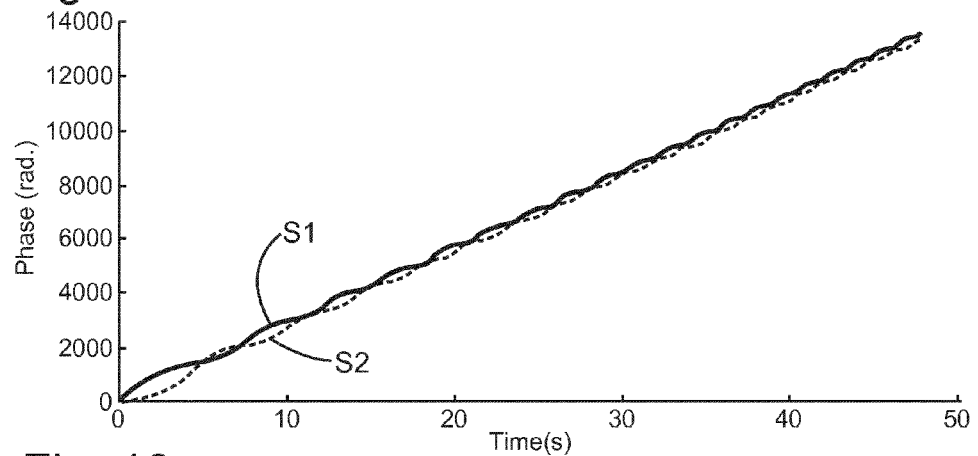
FIGS. 9-11 are graphs of instantaneous phase, instantaneous frequency, and sweep rate for two source signals corresponding to sources S1 and S2, each signal phase modulated by a sinusoidal time-variant-frequency function.
Figure 10:
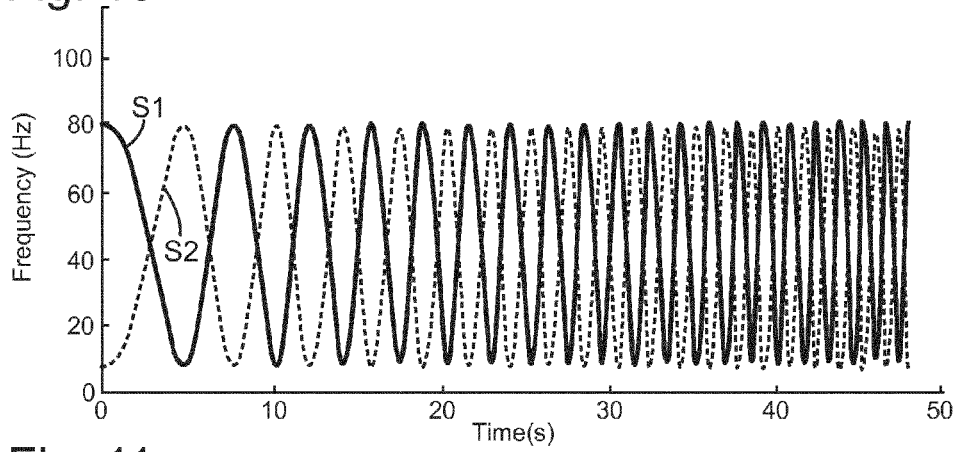
Figure 11:
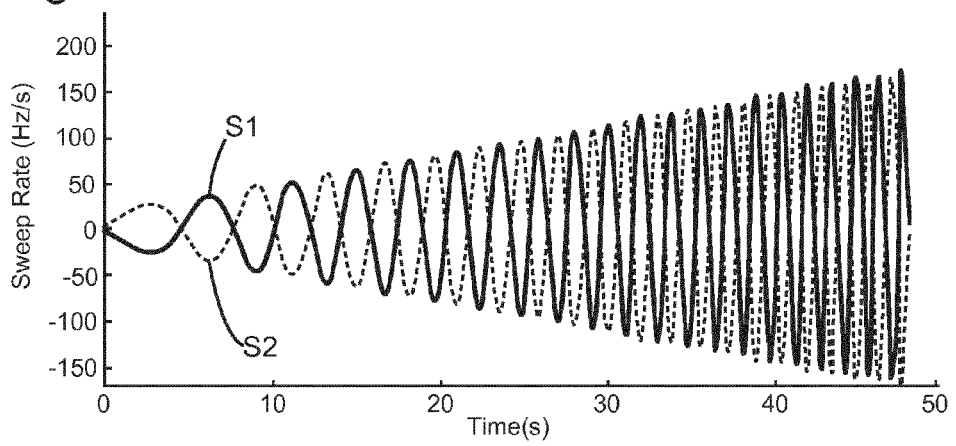

Further embodiments are now discussed. According to an embodiment, the instantaneous frequency F(t) may be a combination of a constant frequency term (e.g., nominal frequency) and a sinusoidal-varying frequency function (e.g., perturbation, see equation (24)) whose frequency increases linearly with time so that the instantaneous frequency F(t) for two sources indexed {k=1, 2} can be expressed as, where the k=0 corresponds to source S1 and the k=1 corresponds to source S2:

$$F(t) = \frac{F_b + F_e}{2} + \frac{F_e - F_b}{2}\cos[\phi_k + 2\pi F_{mod}T(t)], \tag{26}$$

where $$\phi_k = \frac{2\pi k}{N_s}$$

with k=0 to $N_s$−1, T(t) is the distorted time-scale and it is given by a parabolic function of time, e.g., T(t)=(at +b)t where a and b are selectable parameter constants, and the constant $F_{mod}$ is considered to be:

$$F_{mod} = \frac{N_{cycles}}{L}, \tag{27}$$

where $N_{cycles}$ may be chosen to have any value, for example, 20. The instantaneous phase for this modulation scheme is illustrated in FIG. 9, the instantaneous frequency is illustrated in FIG. 10 and the sweep rate is illustrated in FIG. 11, assuming $F_b$=8 Hz, $F_e$=80 Hz and L=48s. It can be seen in FIG. 9 that the analytic phases of both sources S1 and S2 have a linear increasing phase trend with sinusoidal perturbations about the ramp that is increasing in frequency. The instantaneous frequency in FIG. 10 is proportional to the time derivative of phases shown in FIG. 9, and both instantaneous frequencies vary sinusoidally about their mean frequency of 44 Hz and the perturbation frequency increases with time. The sweep rate shown in FIG. 11, which is the time derivative of the frequencies of FIG. 10, it can be seen that the amplitude of the instantaneous sweep rate increases with time. In this particular example, the instantaneous sweep rates may be in excess of 150 Hz/s, which in practice may be a challenge for the vibrator controller. Although high instantaneous sweep rates may be a challenge for present vibrator controllers, this embodiment has the purpose to show how to modulate the instantaneous frequency irrespective of the limitations of the control signals. Other modulation perturbation functions that avoid high instantaneous sweep rates are later discussed.

Figure 12:
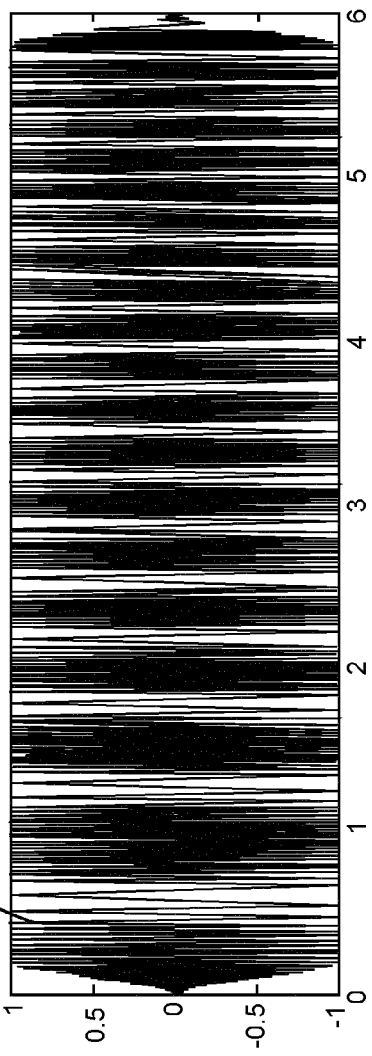
FIGS. 12 and 13 illustrate the driving signals of two sources S1 and S2 in the time domain.
Figure 13:
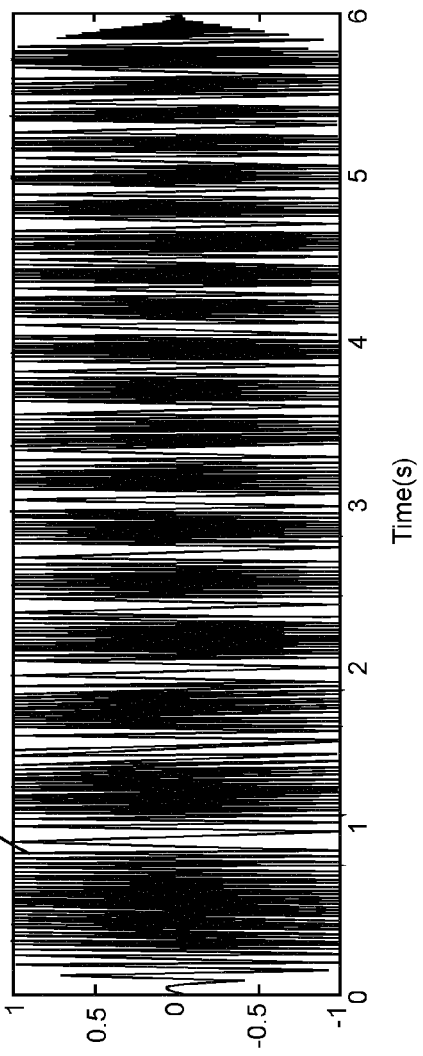
Figure 14:
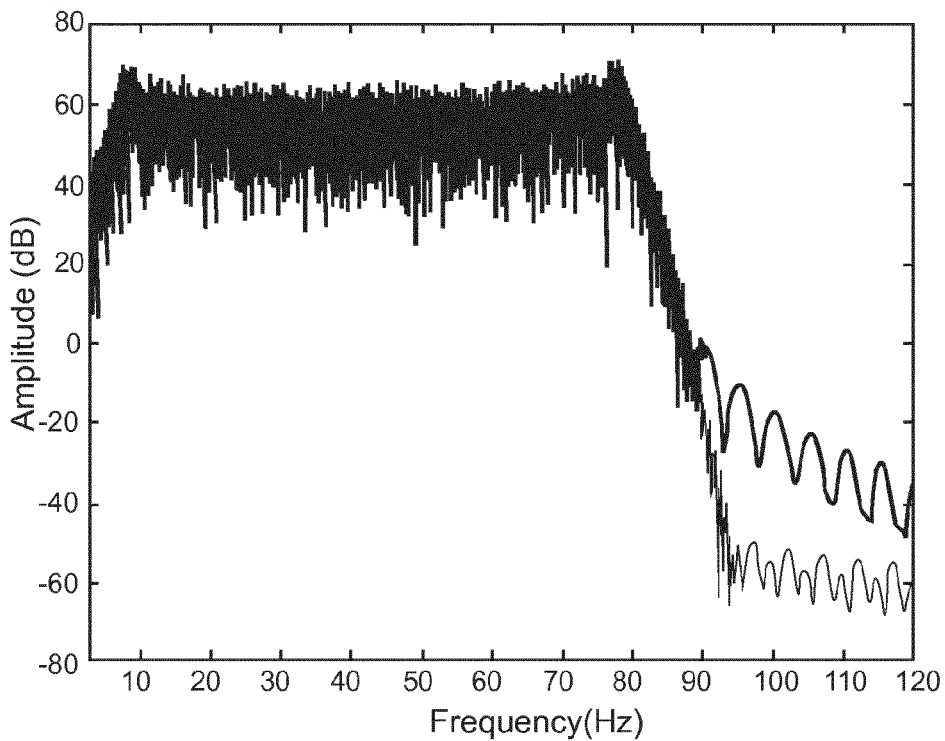
FIG. 14 is a graph of the amplitude power spectrum for the two sources of FIGS. 12 and 13.
Figure 15:
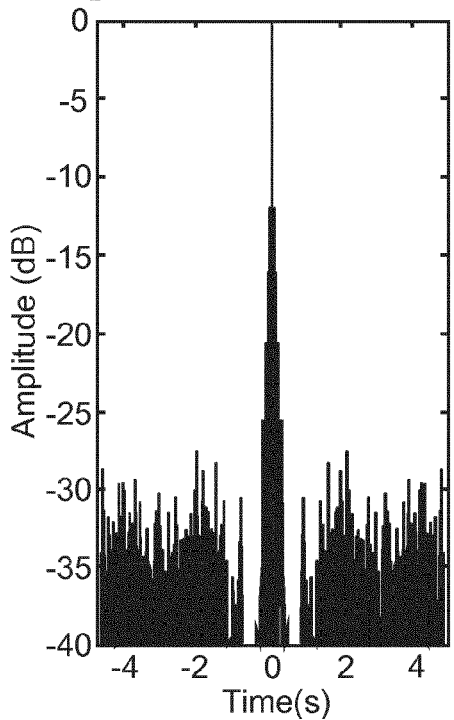
FIG. 15 is a graph of the amplitude of the autocorrelation wavelet for the source S1 driving signal.
Figure 16:
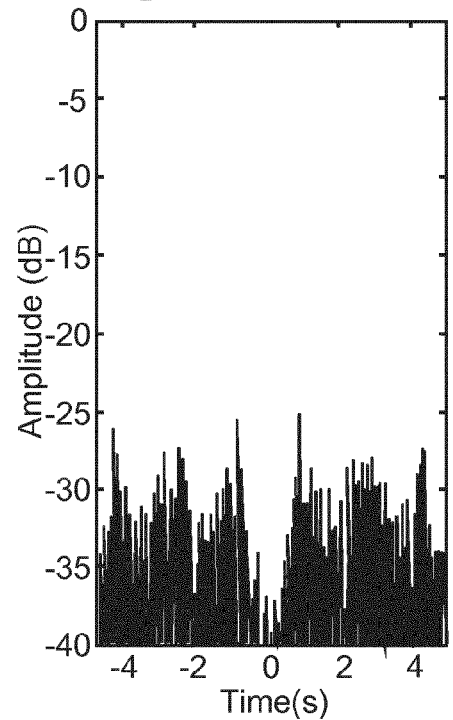
FIG. 16 is a graph of the amplitude of the cross-correlation wavelet between sources S1 and S2's source signals.

The time-signals 1 and 2 for the modulation scheme discussed above are illustrated in FIGS. 12 and 13. FIG. 14 shows the amplitude spectrum, FIG. 15 shows the autocorrelation of source S1's signal 1, and FIG. 16 shows the cross-correlation of the two signals 1 and 2 corresponding to sources S1 and S2. As can be seen in FIGS. 14, 15 and 16, this particular embodiment has many of the same characteristics of a pseudorandom signal, i.e., 1) FIG. 14 shows that it has a not so smooth energy spectral density; 2) FIG. 15 shows that the amplitude of the near side-lobes is low but that the longer lag sidelobes do not fall off as they would for a conventional swept sine wave; and 3) FIG. 16 shows that the cross-correlation artifacts are about the same as the autocorrelation side-lobe levels with very low crosstalk energy near the zero lag. Note that because only two sources were used for the above example, the initial phase has been chosen to be zero. However, more sources may be considered by changing the initial phase to be:

$$\phi_k = \frac{2\pi k}{N_s}, \quad (28)$$

with $N_s$ being the number of sources and $\phi_k$ is the initial phase of the $k^{th}$ source, with index number $k=0 \ldots N_s-1$.

Another way to mathematically define the same modulation scheme is to use pseudo-sweeps as described by equation:

$$F(t) = \frac{F_b + F_e}{2} + \frac{F_e - F_b}{2} \cos\left[\phi_k + 2\pi \int_0^t \upsilon(\tau) d\tau\right], \quad (29)$$

where $L_1$ and $L_2$ (see, equation (30) are the pseudo-sweeps time duration and have a value of 2 and 1, respectively, and $\upsilon(\tau)$ is the instantaneous modulation-frequency of the instantaneous frequency F(t) of the sweep expressed as follows:

$$\upsilon(\tau) = \frac{1}{2L_1} + \frac{1}{L}\left(\frac{1}{2L_2} - \frac{1}{2L_1}\right)t, \quad (30)$$

where, in one embodiment, the sum of L1 and L2 should not be greater than the sweep length L.

Figure 17:
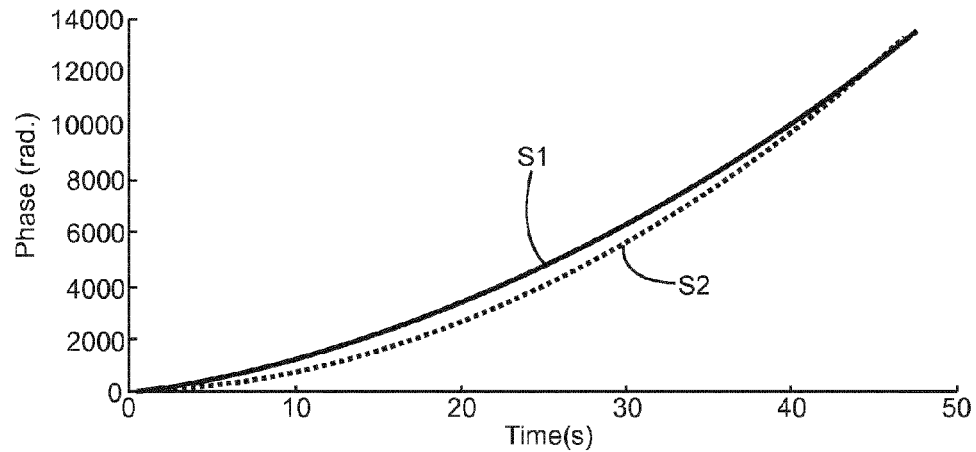
FIGS. 17-19 are graphs of instantaneous phase, instantaneous frequency, and sweep rate for two linear sweep source signals that have been modulated with a single-frequency modulation function.
Figure 18:
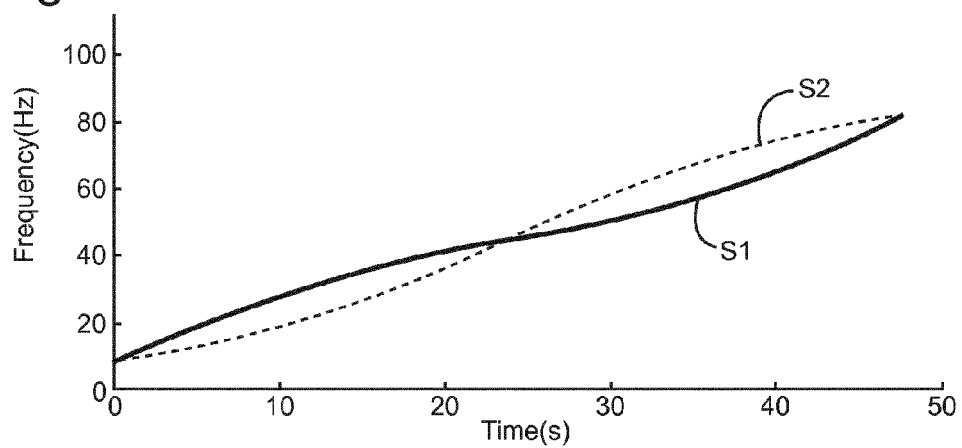
Figure 19:
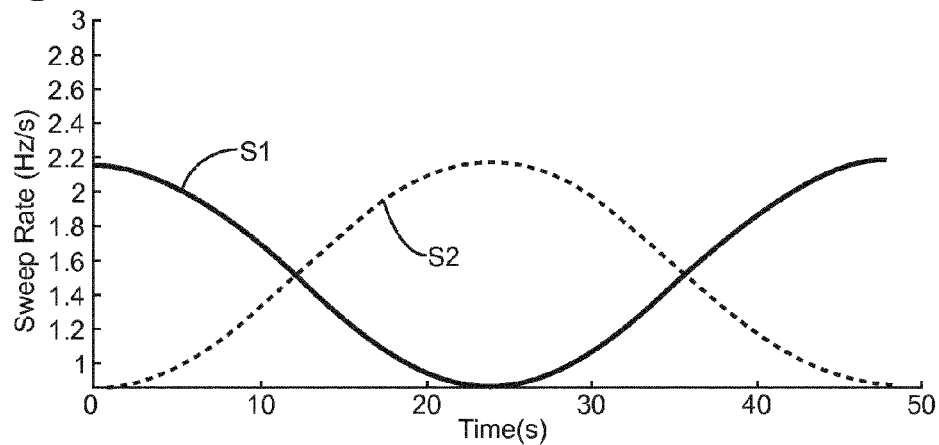
Figure 20:
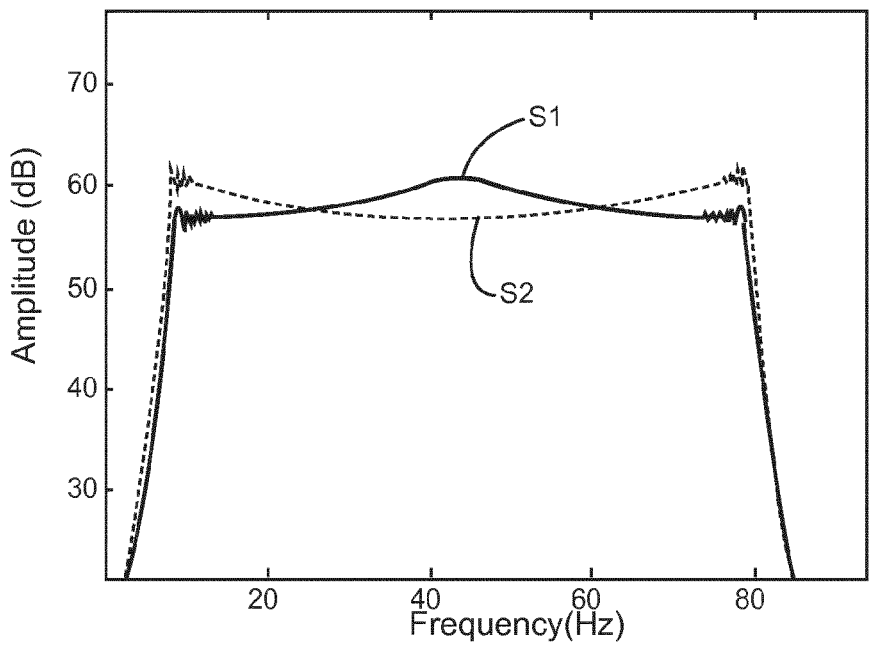
FIG. 20 is a graph of the amplitude energy spectrum for the two source signals.
Figure 21:
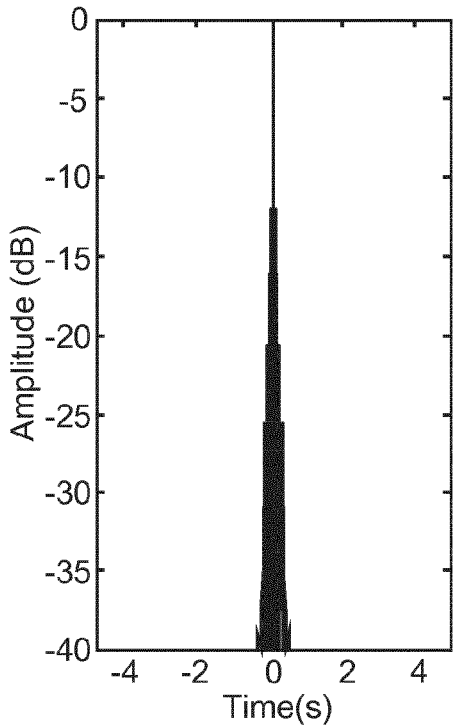
FIG. 21 is a graph of an autocorrelation wavelet amplitude of the driving signal for a first source.
Figure 22:
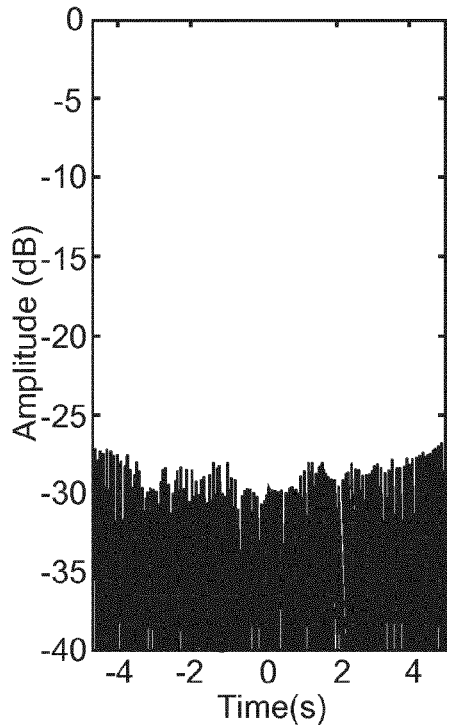
FIG. 22 is a graph of a cross-correlation wavelet amplitude of the driving signals between the first and second sources.
Figure 23:
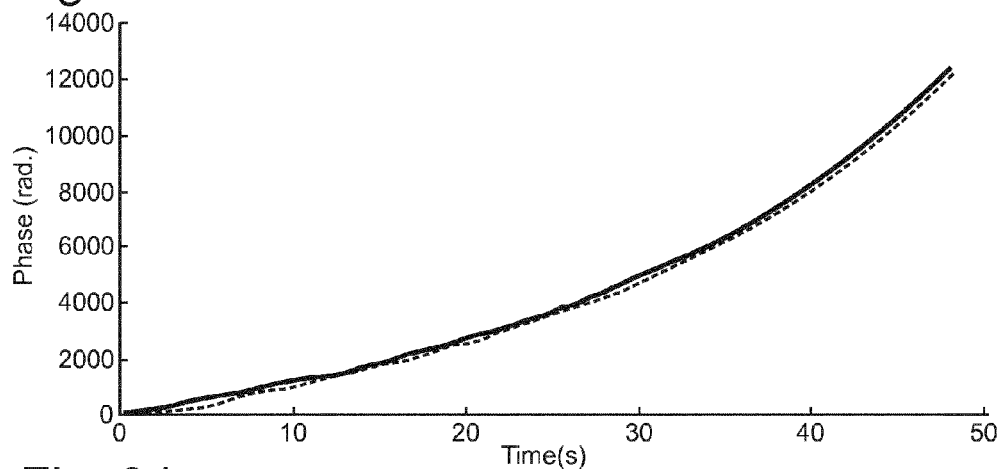
FIGS. 23-25 are graphs of instantaneous phase, instantaneous frequency, and sweep rate for two exponential sweep source signals that have been phase modulated by a sinusoidal-time-variant frequency function.
Figure 24:
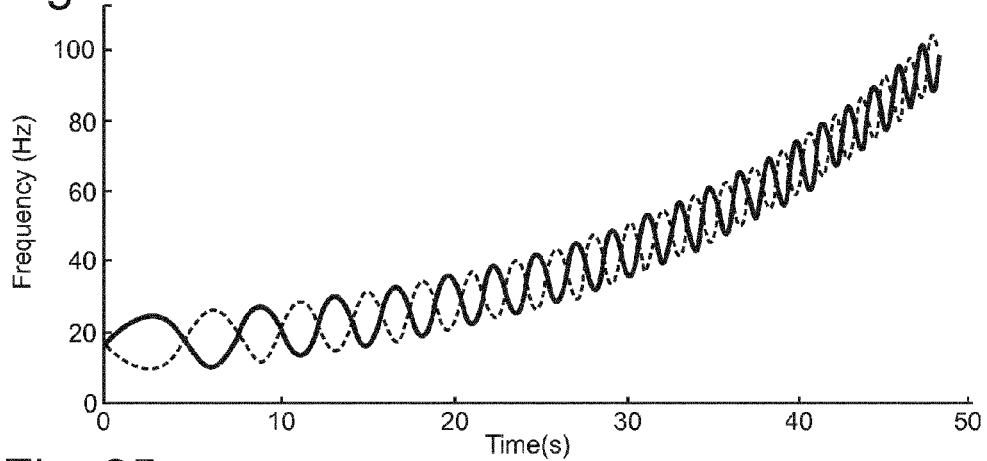
Figure 25:
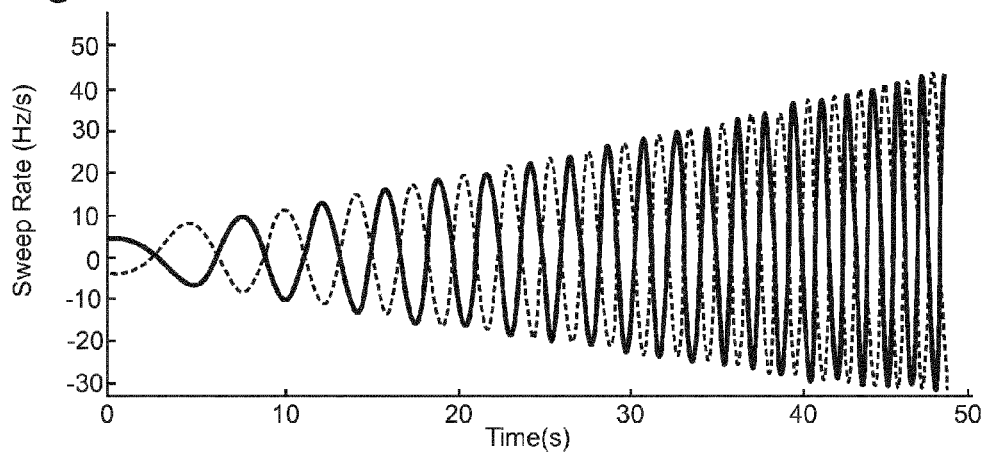
Figure 26:
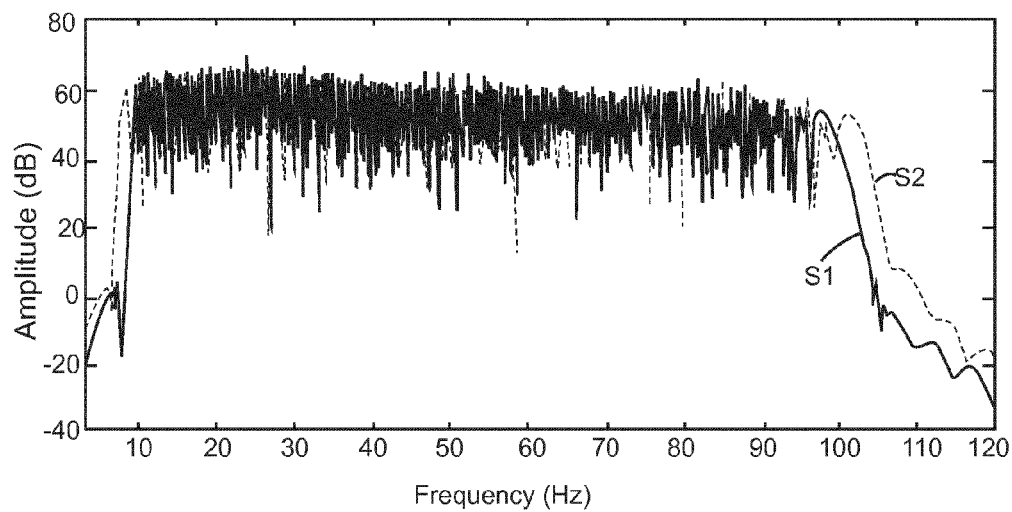
FIG. 26 is a graph of the amplitude power spectrum for the two source signals.
Figure 27:
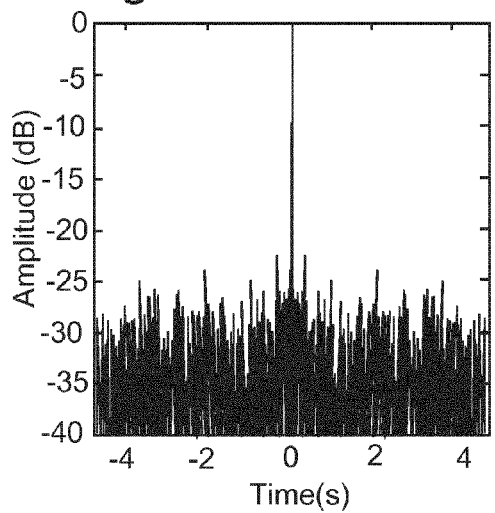
FIG. 27 is a graph of an autocorrelation wavelet amplitude of the driving signal for a first source.
Figure 28:
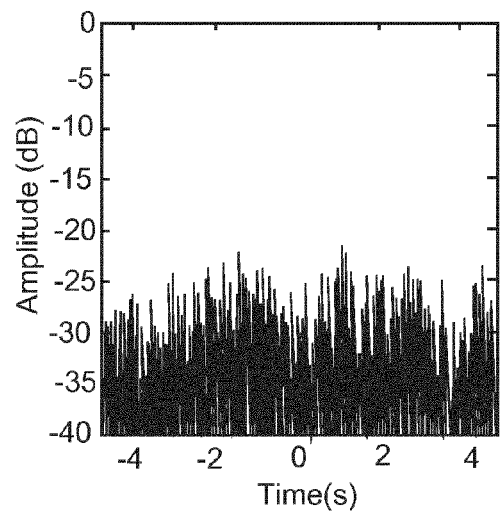
FIG. 28 is a graph of a cross-correlation wavelet amplitude between the driving signals for the first and second sources.

According to another embodiment, there is a single-oscillation modulation scheme that applies a single-cycle fluctuation to the instantaneous frequency with a linearly increasing average in time as described by the following equation:

$$F(t) = F_b + \frac{F_e - F_b}{L}t + A_m \sin[\phi_k + 2\pi F_{mod} t], \quad (31)$$

where F(t) is the sum of the nominal frequency $$F_{nom} = F_b + \frac{F_e - F_b}{L}t$$

and the perturbation term, i.e., $P(t) = A_m \sin[\phi_k + 2\pi F_{mod} t]$, $A_m$ is a selectable constant amplitude coefficient (having a value of, for example, 5 in FIGS. 17-22) and $N_{cycles}=1$ for $F_{mod}$ given by equation (27). Similar to the previous embodiment, for two sources S1 and S2, the initial phase $\phi_0$ was taken to be zero. However, more sources may be added by changing the initial phase similar to equation (28). For this modulation scheme, FIG. 17 illustrates the instantaneous phases for sources S1 and S2, FIG. 18 illustrates the instantaneous frequency, FIG. 19 illustrates the sweep rate, FIG. 20 illustrates the amplitude spectrum, FIG. 21 illustrates the first source's autocorrelation signal (note that the side lobes are greatly reduced) and FIG. 22 illustrates the cross-correlation of the first and second sources' signals 1 and 2.

Still another modulation scheme is described in the next embodiment. This modulation scheme applies an exponential increasing average in time function as described by:

$$F(t) = 2F_b + \frac{K_r^{T(t)} - 1}{\ln(K_r)} + F_b \sin[\phi_k + 2\pi F_{mod} T(t)], \quad (32)$$

where constant $K_r$ has been chosen to be 1.2 in the example shown in FIGS. 23 to 28. These figures respectively illustrate the instantaneous phase, instantaneous frequency, sweep rate, amplitude spectrum, autocorrelation and cross-correlation for the exponential increasing average in time modulation scheme.

A design of the phase-modulated sweeps may be performed by modeling the relationship between the cross-correlation, time-frequency distribution, the frequency spectrum and the instantaneous-frequency of the desired set of signals. In other words, unlike the previous embodiments, the phase modulated signal was directly designed, now a cross-correlation pattern (the desired output) is targeted with various desired constraints, for example, on the maximum variation of the spectrum amplitude or the cross-correlation spreading time, and then generate the phase modulated signal. For example, the amplitude spectra displayed in FIG. 20 exhibits some interesting properties because it is relatively flat with no notches. This is due to the monotony of the instantaneous frequency. The monotonous instantaneous frequency is a desirable and necessary condition for achieving an amplitude spectrum with no notch. Two useful features of one or more embodiments are (1) the ability to constrain the instantaneous sweep rate so that the resultant amplitude spectra do not have excessive droop (e.g., loss of signal energy over a particular frequency band) and (2) the flexibility to couple the instantaneous frequency modification scheme with other sweep methods that modify sweep rate to accommodate equipment/and or environmental constraints due to stroke, flow and/or nearby infrastructure, for example, sweep methods like EmphaSeis™ (CGG trademark) described in U.S. Pat. No. 8,274,862, the entire content of which is included herein by reference. An embodiment to implement those useful features is now discussed.

Assume that is desirable is to limit the amplitude variation of the amplitude spectrum by conditioning the amplitude of the sweep rate modulation by fixing the maximum "droop" value $\delta_{max}$ defined by the maximum amplitude variation (in dB) within the useful frequency bandwidth $[F_b, F_e]$. The sweep rate $R_{mod}$ may be modeled as:

$$R_{mod}(f) = \exp\left(\frac{\ln(10)}{20}\delta_{max}\cos\left[2\pi fN_{cycles}\frac{f-F_b}{F_e-F_b}+\phi_k\right]\right) \quad (33a)$$

where $N_{cycles}$ is a constant that corresponds to the number of oscillation cycles. In this embodiment, the selectable parameters are the initial phase represented as $\phi_0$ and $N_{cycles}$. This equation may be rewritten as:

$$R_{mod}(\text{in dB}) = 20\log_{10}R_{mod} = \delta_{max}\cos\left[2\pi fN_{cycles}\frac{f-F_b}{F_e-F_b}+\phi_k\right] \quad (33b)$$

Figure 29:
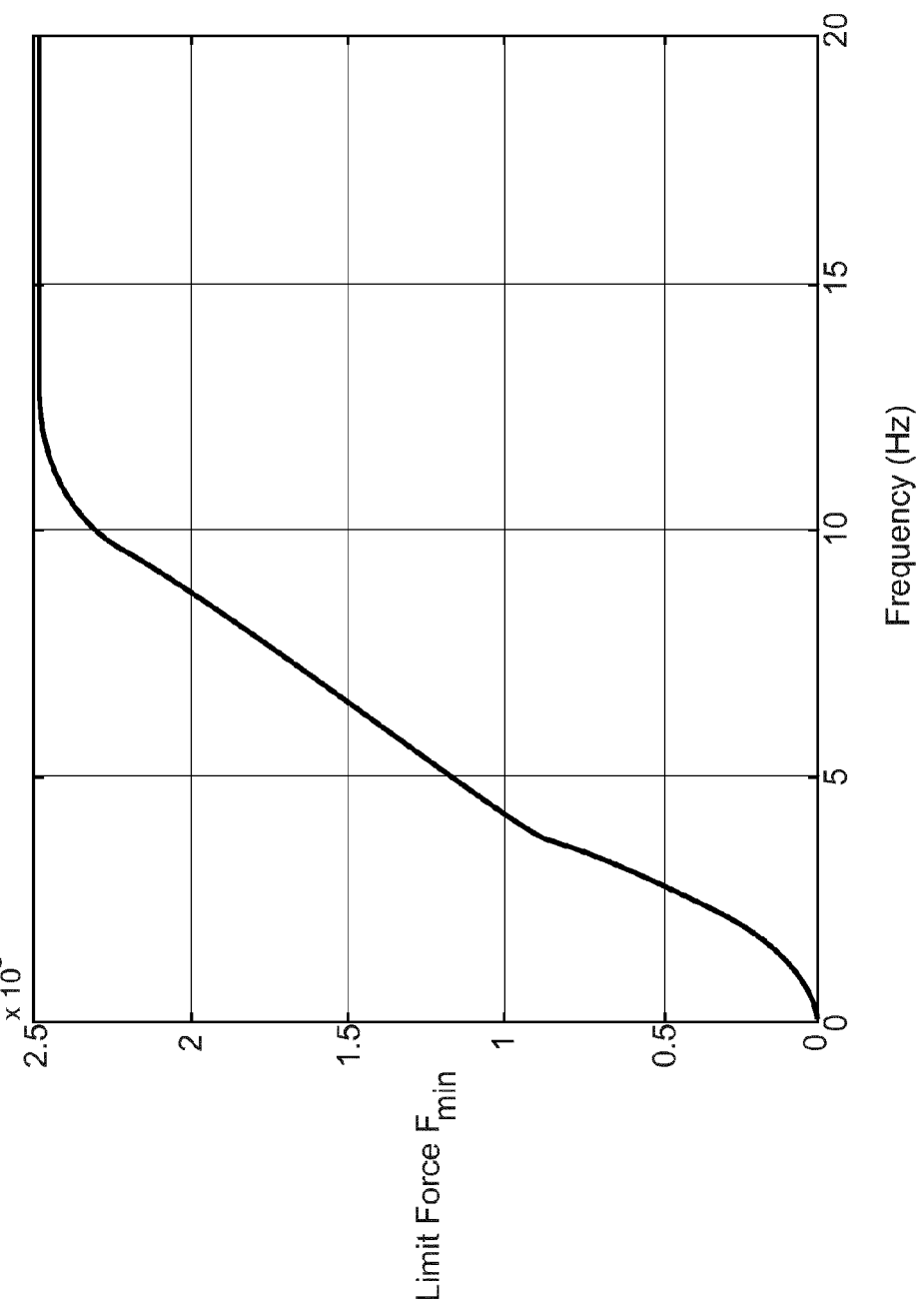
FIG. 29 is a graph of a force limit experienced by a source.

This specific modulation shows: (1) the sweep rate modulation amplitude limitation $\delta_{max}$ in dB and (2) the sinusoidal modulation law of the sweep rate modulation. Based on equation (31a), it is possible to modify the sweep rate further to accommodate temporal peak amplitude constraints used in sweep methods like EmphaSeis, the modified sweep rate R(f) being given by:

$$R(f)=R_{mod}(f)\cdot R_{EmphaSeisCorr}(f), \quad (34)$$

with the correction of the sweep-rate related to the Emphaseis correction expressed as:

$$R_{EmphaSeisCorr}(f) = \left(\frac{\mathcal{F}_{lim}(f)}{\max(\mathcal{F}_{lim}(f))}\cdot\frac{1}{|\mathcal{A}(f)|}\right)^2 \quad (35)$$

where $|\mathcal{A}(f)|$ is a gain function chosen to shape a desired target signal amplitude spectrum $|\tilde{S}(f)|$, and $\mathcal{F}_{lim}(f)$ is the limit output force as a function of frequency imposed by the vibrator mechanical constraints, e.g., the maximum reaction-mass displacement, the maximum pump flow, the peak force, and so one. Note that the sweep rate EmphaSeis correction aims to account for the vibrator mechanical limitations design as illustrated in FIG. 29. Because the maximum force amplitude delivered by the vibrator changes with frequency, using this weighting coefficient, the sweep rate is: (1) lowered adequately where the maximum sweep amplitude is limited by the vibrator (e.g., related to the first term $$\frac{\mathcal{F}_{lim}(f)}{\max(\mathcal{F}_{lim}(f))}\bigg),$$

(2) adjusted adequately regarding the desired target amplitude spectrum for the output ground force (related to the second term $$\frac{1}{|A(f)|}\bigg).$$

FIG. 29 is an example of such output force limitation. Note that this graph changes from source to source depending on the characteristics of the source.

The embodiments discussed with regard to FIGS. 5-8 used cubic polynomials for perturbing the sweeps while the embodiments discussed with regard to FIGS. 9-29 used sine wave functions for the perturbation functions. The use of a single cubic polynomial may limit the embodiments to no more than one full cycle of frequency perturbation. If more cycles are desired, a method of bicubic splines may be used where different cubics are used to cover different time intervals with some smooth end conditions imposed, or the sine wave functions may be used.

If there is no limit to the amount of fluctuations, the autocorrelation sidelobes will tend to rise. This may or may not be a real issue, depending on whether or not signature deconvolution is used. Adjoined cubic splines, or higher order polynomials, for example, $4^{th}$ or $5^{th}$ order polynomials, can be used to describe the frequency perturbation function should the user desire to increase the number of allowed fluctuations.

Increasing the number of allowed fluctuations should reduce the cross-talk, but will probably increase the near sidelobe levels in the autocorrelation. The cubic perturbations may work better if longer sweeps are used.

Figure 30:
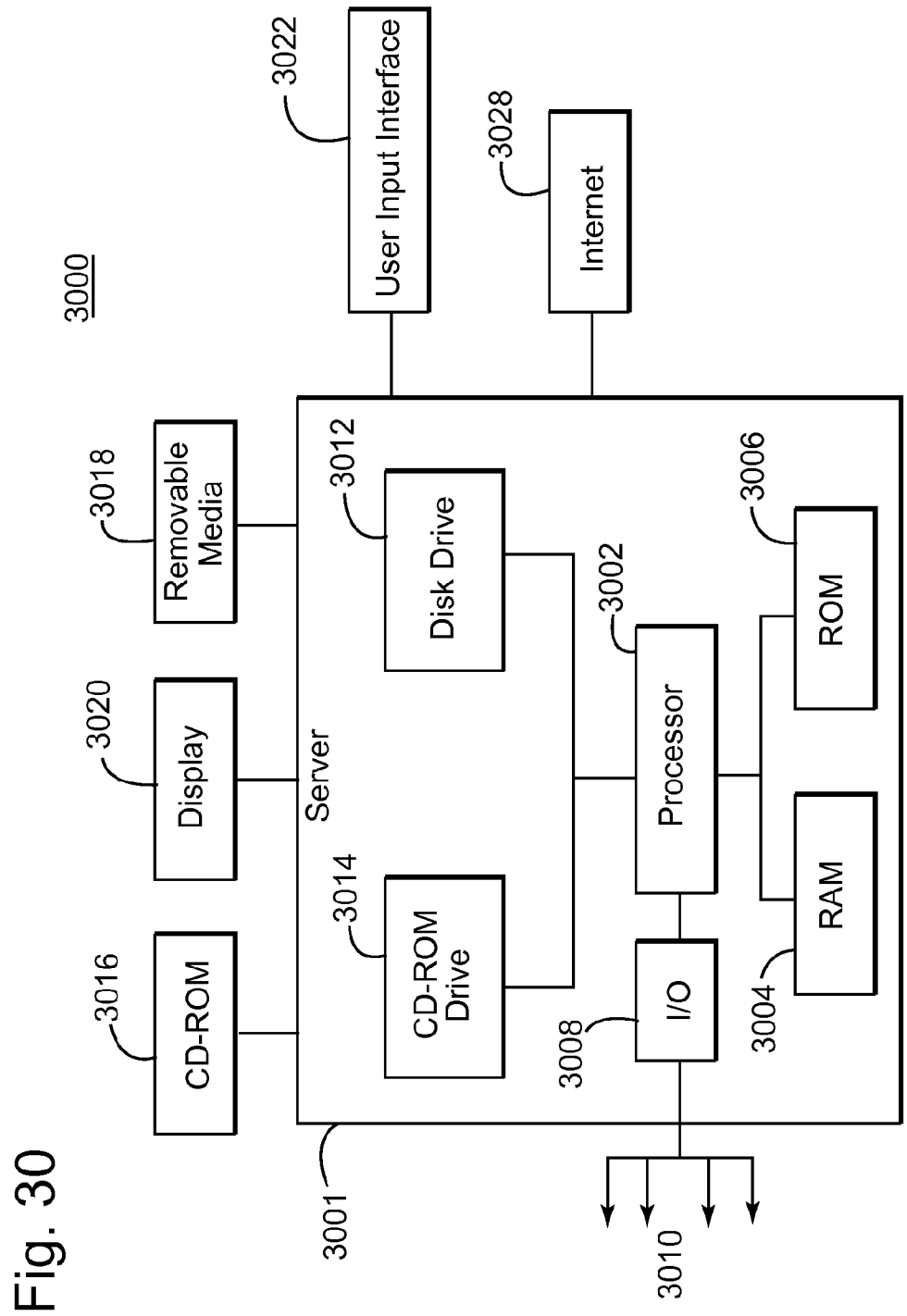
FIG. 30 is a schematic diagram of a controller according to an exemplary embodiment.

An example of a representative computational system capable of carrying out operations in accordance with the exemplary embodiments discussed above is illustrated in FIG. 30. Hardware, firmware, software or a combination thereof may be used to perform the various steps and operations described herein. The control system 3000 of FIG. 30 is an exemplary computing structure that may be used in connection with such a system.

The exemplary control system 3000 suitable for performing the activities described in the exemplary embodiments may include server 3001. Such a server 3001 may include a central processor unit (CPU) 3002 coupled to a random access memory (RAM) 3004 and to a read-only memory (ROM) 3006. The ROM 3006 may also be other types of storage media to store programs, such as programmable ROM (PROM), erasable PROM (EPROM), etc. The processor 3002 may communicate with other internal and external components through input/output (I/O) circuitry 3008 and bussing 3010, to provide control signals and the like. For example, the processor 3002 may communicate with the acquisition system and/or the vibrator control system. The processor 3002 carries out a variety of functions as is known in the art, as dictated by software and/or firmware instructions.

The server 3001 may also include one or more data storage devices, including hard and floppy disk drives 3012, CD-ROM drives 3014, and other hardware capable of reading and/or storing information such as a DVD, etc. In one embodiment, software for carrying out the above discussed steps may be stored and distributed on a CD-ROM 3016, diskette 3018 or other form of media capable of portably storing information. These storage media may be inserted into, and read by, devices such as the CD-ROM drive 3014, the disk drive 3012, etc. The server 3001 may be coupled to a display 3020, which may be any type of known display or presentation screen, such as LCD displays, plasma displays, cathode ray tubes (CRT), etc. A user input interface 3022 is provided, including one or more user interface mechanisms such as a mouse, keyboard, microphone, touch pad, touch screen, voice-recognition system, etc.

The server 3001 may be coupled to other computing devices, such as the equipment of a vessel, via a network. The server may be part of a larger network configuration as in a global area network (GAN) such as the Internet 3028, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile discs (DVD), optical storage devices, or magnetic storage devices such a floppy disk or magnetic tape. Other non-limiting examples of computer readable media include flash-type memories or other known types of memories.

The disclosed exemplary embodiments provide a source array, computer software, and method for generating acquisition schemes for under water vibrational sources. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating sweep signals corresponding to plural sources that generate seismic waves, the method comprising:
selecting a nominal sweep signal (S0) whose phase φ(t) is characterized by an instantaneous frequency $$F(t) = \frac{1}{2\pi}\frac{\partial \varphi(t)}{\partial t};$$

applying a perturbation (P) to the nominal sweep signal (S0); and calculating the sweep signals (Sn) by varying the perturbation (P), each sweep signal corresponding to a seismic source,
wherein the perturbation causes a frequency rate change, $$\frac{d}{dt}P(t),$$

that is less than a predetermined fraction, γ, of a nominal sweep's frequency rate $$\frac{d}{dt}F(t).$$

2. The method of claim 1, wherein the predetermined fraction is less than 0.5.

3. The method of claim 1, wherein the perturbation (P) is a polynomial function of time.

4. The method of claim 3, further comprising:
selecting coefficients of the polynomial function.

5. The method of claim 4, further comprising:
applying constraints to the coefficients, the constraints including at least one of:
maintaining perturbed sweep frequency within a predetermined range; and
having the instantaneous frequency monotonically increasing.

6. The method of claim 5, further comprising:
calculating candidate sweep signals;
calculating auto- and cross-correlations of the candidate sweep signals;
computing performance statistics associated with the auto- and cross-correlations of the candidate sweep signals;
comparing the performance statistics with reference performing statistics; and
selecting the candidate sweep signals to be the sweep signals (Sn) if a result of the comparing step is positive.

7. The method of claim 1, wherein the perturbation (P) is a non-linear function of time.

8. The method of claim 1, wherein the perturbation (P) includes a sine term.

9. The method of claim 1, further comprising:
downloading in each source a corresponding sweep signal; and
acquiring seismic data with the sweep signals.

10. The method of claim 1, wherein each one of the sweep signals is unique and when the plural sources operate simultaneously, a cross-correlation among the plural sources is minimized.

11. A computing device for generating sweep signals corresponding to plural sources that generate seismic waves, the computing device comprising:
a processor configured to,
select a nominal sweep signal (S0) whose phase φ(t) is characterized by an instantaneous frequency $$F(t) = \frac{1}{2\pi}\frac{\partial \varphi(t)}{\partial t};$$

apply a perturbation (P) to the nominal sweep signal (S0); and calculate the sweep signals (Sn) by varying the perturbation (P), each sweep signal corresponding to a seismic source, the perturbation causes a frequency rate change, $$\frac{d}{dt}P(t),$$

that is less than a predetermined fraction, γ, of a nominal sweep's frequency rate $$\frac{d}{dt}F(t).$$

12. The computing device of claim 11, wherein the predetermined fraction is 0.5.

13. The computing device of claim 11, wherein the perturbation (P) is a polynomial function of time.

14. The computing device of claim 13, wherein the processor is further configured to:
select coefficients of the polynomial function.

15. The computing device of claim 14, wherein the processor is further configured to:
apply constraints to the coefficients, the constraints including at least one of:
maintaining perturbed sweep frequency within a predetermined range; and
having the instantaneous frequency monotonically increasing.

16. The computing device of claim 15, wherein the processor is further configured to:
calculate candidate sweep signals;
calculate auto- and cross-correlations of the candidate sweep signals;
compute performance statistics associated with the auto- and cross-correlations of the candidate sweep signals;
compare the performance statistics with reference performing statistics; and
select the candidate sweep signals to be the sweep signals (Sn) if a result of the comparing step is positive.

17. The computing device of claim 11, wherein the perturbation (P) is a non-linear function of time.

18. The computing device of claim 11, wherein the perturbation (P) includes a sine term.

19. The computing device of claim 11, wherein each one of the sweep signals is unique and when the plural sources operate simultaneously, a cross-correlation among the plural sources is minimized.

20. A non-volatile computer readable medium including computer executable instructions, wherein the instructions, when executed, implement a method for generating sweep signals corresponding to plural sources that generate seismic waves, the method comprising:
selecting a nominal sweep signal (S0) whose phase φ(t) is characterized by an instantaneous frequency $$F(t) = \frac{1}{2\pi}\frac{\partial \varphi(t)}{\partial t};$$

applying a perturbation (P) to the nominal sweep signal (S0); and
calculating the sweep signals (Sn) by varying the perturbation (P), each sweep signal corresponding to a seismic source,
wherein the perturbation causes a frequency rate change, $$\frac{d}{dt}P(t),$$

that is less than a predetermined fraction, γ, of a nominal sweep's frequency rate $$\frac{d}{dt}F(t).$$

* * * * *